May 21, 1957 H. I. CRANE ET AL 2,793,146
METHODS OF TREATING GERMANIUM
Filed March 10, 1954
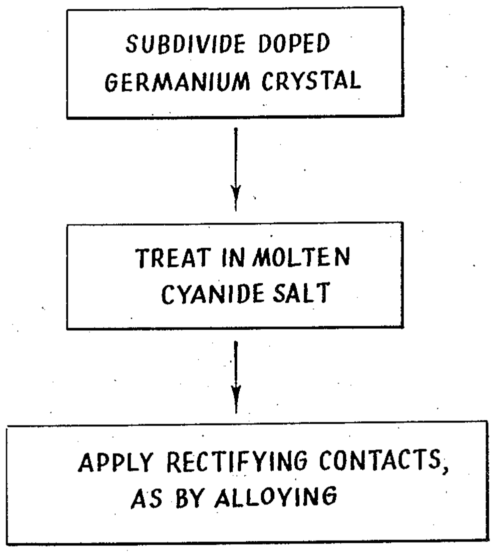
INVENTORS
HORACE IRVING CRANE
PEI WANG
BY Paul S. Martin
ATTORNEY 2,793,146
Patented May 21, 1957

2,793,146

METHODS OF TREATING GERMANIUM

Horace Irving Crane, Waltham, and Pei Wang, Ipswich, Mass., assignors to Sylvania Electric Products Inc., a corporation of Massachusetts Application March 10, 1954, Serial No. 415,305

5 Claims. (Cl. 148—13.1)

The present invention relates to semiconductors and semiconductor devices, and in particular to the preparatory treatment of semiconductor materials in the manufacture of semiconductor devices.

In the manufacture of semiconductor devices in which a body of germanium is prepared by any of a variety of techniques so as to contain a suitable predominant trace of donor or acceptor material, and on which rectifying contacts are formed, it has often been found that the resulting devices are unstable at the time they are finished, they remain unstable in characteristics for a period of time, and apart from being erratic in operation they are of uncertain shelf life. Through the present invention, the characteristics of germanium devices are improved in some respects, and the reliability of these devices over long periods of time is vastly improved. In an application of this invention, germanium of the desired resistivity and conductivity type is subdivided into individual bodies suitable for use in devices, and in this state the germanium body is treated in a molten cyanide salt. Potassium cyanide may be used, or sodium cyanide, or a mixture of these cyanides with each other or with sodium chloride. One or more rectifying connections is thereafter suitably applied, typically a point contact or an alloy junction, and an ohmic connection is also usually applied. In another application of the invention, a grown crystal of germanium may be sub-divided into individual units each embodying one or more rectifying junctions, with different types of trace donor and acceptor impurities predominating at opposite sides of each rectifying junction. Such devices are commonly called grown junction rectifiers and grown junction transistors. The germanium is extremely pure except for the conductivity-type controlling traces of impurities that are usually present, in amounts of the order of $10^{-5}\%$. These may be a group III–B element such as indium, gallium or aluminum, as acceptors for imparting p-type conductivity, or a group V–B element as donors, such as arsenic or antimony, to impart n-type conductivity. It is highly desirable that the germanium to be treated should be subdivided to the size employed in making devices, so that contaminating treatements may be avoided as much as possible and so that the rectifying connection or junction may be found at a treated surface. The treatment in the molten cyanide seems to eliminate foreign uncontrolled impurities incidentally present in the germanium, such as copper and nickel which are believed to be present in crystalline germanium as interstitial impurities whereas the group III–B and group V–B are believed present in the crystal lattice. The germanium surface following the treatment is evidently passivated. The translator units when finished as diodes or as transistors (depending on the number and arrangement of rectifying contacts) possess remarkable stability initially and this is maintained over long periods of time even when the germanium surface is not protected from the ordinary atmosphere, as when enclosed for mechanical protection in unsealed containers.

The annexed drawing is an illustrative flow chart showing the processing of germanium translators illustrating an application of the invention.

In an illustrative treatment, dice or wafers .06 inch wide by .12 inch long by approximately .006 inch thick are cut from a large crystal of 5-ohm-centimeter n-type germanium and are immersed in a porcelain vessel containing potassium cyanide which is then brought to a temperature in excess of the cyanide melting point but below that of germanium, 700° C. being suitable. This is conveniently conducted in a nitrogen atmosphere, or any other neutral atmosphere, the germanium being subjected under these conditions to high temperature treatment, for a period of hours if contaminating impurities of the rapid diffusion type are to be removed not only from the surface of the germanium but also from the bulk. Thereafter the system is allowed to cool and the cyanide is flushed away with repeated aqueous washes, and the germanium is dried. Doubly distilled water is desirable as a wash to avoid recontamination of the surface of the germanium.

In an illustrative application of this treated germanium, rectifying junctions are formed on opposite faces of the dice, with indium dots alloyed to the germanium surfaces in a broadly conventional furnace treatment. The alloying treatment advantageously is effected in a hard vacuum. The two indium dots plus an ohmic connection that is also formed on the germanium constitutes an alloy junction transistor of remarkably stable properties. There are also indications that improvement can be expected in increasing the collector resistance of such transistors made with the cyanide-treated wafers or dice.

During the treatment in potassium cyanide, only a fractional percent of the original weight of the germanium is lost, showing that the potassium cyanide does not attack the germanium appreciably; however, the surface of the germanium after this treatment shows a fine pattern of etch pits, and correspondingly there is some slight loss of weight of the germanium.

It is desirable that the potassium cyanide treatment should be carried out after the germanium has been reduced to the sizes employed in making devices. This is because the treatment can be effective more thoroughly when the thickness of the specimen is at a minimum, as contrasted to treatment of the large crystal or ingot of the germanium before subdivision. Moreover the treated, passivated surface is ultimately available in the finished device. In contrast, were the cyanide treatment practiced on the ingot or larger crystal or even on the melt, much of its merits might be obliterated or masked. In respect to the bulk-treated material the merit would be partly masked by recontamination of the surfaces that are newly exposed during subdivision of the ingot into dice, as by conventional slicing, polishing, dicing, and aqueous etching treatments normally employed. Further, the surfaces so provided would not have been treated directly by cyanide.

Potassium cyanide mentioned above involves a high minimum treatment temperature because this material melts at approximtaely 634° C. Sodium cyanide melts at approximately 564° C. and can be used if desired in place of the potassium cyanide if a lower temperature treatment of the germanium were to be desired. Similarly, mixtures of salts can be used such as one of these cyanides together with sodium chloride, if still lower treating temperatures are desired; and still lower temperatures can be realized with a molten cyanide salt when a mixture of sodium and potassium cyanides is used in the treatment.

The treatment described occasionally leaves the germanium surface stained with darkened areas that have not been found harmful, but which can be removed if desired with usual surface etchants employed in germanium device fabrication.

In theory the cyanide may act by forcing a stable complex with very small traces of copper that are believed to be present in many carefully prepared germanium crystals. The copper would seem to be removed from the surface of the germanium by chemical reaction; and thereafter at the elevated temperature, copper from the bulk of the germanium wafer may diffuse to the surface, to continue the removal of copper from the specimen by chemical reaction. Certain rapidly diffusing elements which may be present in the germanium such as nickel, for example, may be similarly removed from the germanium to yield germanium freed of such rapid-diffusing impurities and with a passivated surface. The group III–B and group V–B elements which are utilized as conductivity type controlling materials are apparently not affected by the treatment; and this may be due to the accepted theory that these materials are present in the germanium crystal lattice whereas copper and nickel, for example, are believed to be interstitial.

Potassium and sodium cyanides are molten at a suitably high temperature to induce reasonably rapid diffusion of copper and the like from the bulk of the germanium to its surface where the copper is evidently removed by formation of a cyanide complex. Other alkali metal cyanides are within the contemplation of this invention. Accordingly the appended claims should be broadly construed, consistent with the spirit and scope of the invention.

What is claimed is:

1. The method of making semiconductor translators, including the steps of subdividing a germanium ingot into individual units and subjecting such units to prolonged treatment in a molten alkali metal cyanide maintained at a temperature below the melting point of germanium.

2. The method of making semiconductor translators having a semiconductive germanium body containing a predominant trace impurity effective to impart one type of conductivity, including the step of subjecting such germanium body to heat treatment in molten alkali metal cyanide maintained at a temperature below the melting point of germanium.

3. The method of treating germanium in the fabrication of semiconductor devices, including the steps of preparing a large single crystal of germanium substantially pure except for conductivity-type determining impurities, subdividing the crystal into bodies of the approximate size employed in such devices, and exposing the surfaces of such bodies to heat treatment in a molten alkali metal cyanide maintained at a temperature below the melting point of germanium.

4. The method of treating germanium in the fabrication of semiconductor devices, including the steps of preparing a large single crystal of germanium substantially pure except for conductivity-type determining impurities, subdividing the crystal into thin bodies of the approximate thickness employed in such devices, and exposing the surfaces of such bodies to heat treatment in a molten alkali metal cyanide maintained at a temperature in excess of the cyanide melting point but below the germanium melting point.

5. The method of making semiconductor bodies for use in translator devices, including the steps of subdividing an ingot of germanium containing an interstitial impurity of the type of copper and nickel into units of the size of said bodies, and removing said impurity from said units by treating the units in a molten cyanide bath maintained at a temperature below the melting point of germanium.

No references cited.